(12) United States Patent
Hosoi

(10) Patent No.: US 8,965,111 B2
(45) Date of Patent: Feb. 24, 2015

(54) LEARNING APPARATUS, A LEARNING SYSTEM, LEARNING METHOD AND A LEARNING PROGRAM FOR OBJECT DISCRIMINATION

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 13/821,864

(22) PCT Filed: Aug. 2, 2011

(86) PCT No.: PCT/JP2011/068009
§ 371 (c)(1),
(2), (4) Date: Mar. 8, 2013

(87) PCT Pub. No.: WO2012/032889
PCT Pub. Date: Mar. 15, 2012

(65) Prior Publication Data
US 2013/0170739 A1 Jul. 4, 2013

(30) Foreign Application Priority Data
Sep. 9, 2010 (JP) ................................. 2010-201592

(51) Int. Cl.
*G06K 9/62* (2006.01)
*G06K 9/52* (2006.01)
*G06N 99/00* (2010.01)

(52) U.S. Cl.
CPC ............... *G06K 9/52* (2013.01); *G06N 99/005* (2013.01); *G06K 9/6256* (2013.01)
USPC ............................. 382/155; 382/156; 382/158

(58) Field of Classification Search
None
See application file for complete search history.

(56) References Cited

U.S. PATENT DOCUMENTS

| 8,015,132 | B2 * | 9/2011 | Xu ................................ 706/20 |
| 8,135,221 | B2 * | 3/2012 | Jiang et al. .................... 382/224 |
| 8,233,704 | B2 * | 7/2012 | Han et al. ...................... 382/159 |
| 8,588,519 | B2 * | 11/2013 | Liu et al. ....................... 382/159 |

(Continued)

FOREIGN PATENT DOCUMENTS

| JP | 2005-250773 A | 9/2005 |
| JP | 2007-226512 A | 9/2007 |
| WO | 2010/090189 A1 | 8/2010 |

OTHER PUBLICATIONS

Vijayanarasimhan et al., "Keywords to visual categories: Multiple-Instance Learning for weakly supervised object categorization", CVPR 2008.*

(Continued)

*Primary Examiner* — Anand Bhatnagar
*Assistant Examiner* — Soo Park
(74) *Attorney, Agent, or Firm* — Sughrue Mion, PLLC

(57) ABSTRACT

A learning apparatus in the present invention includes a weak discriminator generation unit that generates a weak discriminator which calculates a discrimination score of an instance of a target based on a feature and a bag label, a weak discrimination unit which calculates the discrimination score based on the generated weak discriminator, an instance probability calculation unit that calculates an instance probability of the target instance based on the calculated the discrimination score, a bag probability calculation unit that calculates a probability that no smaller than two positive instances are included in the bag based on the calculated instance probability and a likelihood calculation unit which calculates likelihood representing plausibility of the bag probability based on the bag label.

7 Claims, 14 Drawing Sheets

(56) References Cited

U.S. PATENT DOCUMENTS

| | | |
|---|---|---|
| 8,649,613 B1* | 2/2014 | Leung et al. .................. 382/224 |
| 2009/0018981 A1 | 1/2009 | Zhang et al. |
| 2009/0198654 A1* | 8/2009 | Surendran et al. ................. 707/3 |
| 2009/0274434 A1* | 11/2009 | Mei et al. ......................... 386/52 |

OTHER PUBLICATIONS

Paul Viola et al., "Multiple Instance Boosting for Object Detection" in NIPS 18, 2006, pp. 1419-1426, MIT Press.

Paul Viola et al., "Multiple Instance Boosting for Object Detection", Advance in Neural Processing Systems 18 Proceedings of the 2005 Conference, Massachusetts of Technology May 2006, p. 1417-1424.

Boris Babenko et al., "Simultaneous Learning and Alignment: Multi-Instance and Multi-Pose Learning", Workshop on Faces in 'Real-Life' Images: Detection, Alignment, and Recognition, Marseille: France (2008), [online], p. 1-14, [Search Date Sep. 2, 2011], Internet <URL:http://hal.inria.fr/docs/00/32/67/36/PDF/BabenkoEtAlECCV08simul.pdf>.

International Search Report of PCT/JP2011/068009, dated Sep. 27, 2011.

* cited by examiner

LEARNING APPARATUS, A LEARNING SYSTEM, LEARNING METHOD AND A LEARNING PROGRAM FOR OBJECT DISCRIMINATION

CROSS REFERENCE TO RELATED APPLICATIONS

This is a National Stage of International Application No. PCT/JP2011/068009 filed Aug. 2, 2011, claiming priority based on Japanese Patent Application No. 2010-201592 filed Sep. 9, 2010, the contents of all of which are incorporated herein by reference in their entirety.

TECHNICAL FIELD

The present invention relates to learning for discriminating an object in the image, and especially to a learning apparatus capable of getting the high discrimination precision, a learning system, a learning method and a learning program.

BACKGROUND ART

As one of methods to discriminating the object in the image, there is a method based on statistical pattern recognition technology. This method collects object texture data in advance, carries out learning processing and carries out discrimination processing based on a parameter calculated by the learning processing. As a result, it is discriminated whether the texture in the image to be discriminated belongs to the object. The method is known to be able to get the high discrimination precision.

On the other hand, in order to get the high discrimination precision by the statistical method, it is required to prepare the data (hereinafter, it is described as learning data) needed for carrying out the learning processing. The learning data may be regarded as a set of the image template group which is obtained by cutting a target object that becomes the discrimination and those class information on individual objects (it is called a label). In order to create this learning data, it is necessary to prepare the image which an object is projected on, and prepare more information such as the precise position, size and rotation angle of the target object on the image. The information such as the position, the size and the rotation angle of this target object is usually created by human handwork with watching the image.

It is a problem of the method based on the statistical pattern recognition technology that the work volume for creating this learning data becomes enormous. It is not found before the actual learning and the discrimination how to set the decision reference such as the position, size and rotation angle of the target object when the image template is cut out in order to get the good discrimination precision. For example, a case that target object is a human body is considered. In order to discriminate whether the target object is a human body, it is not found before the actual prompt which is better the utilization of a whole body image as an image template or the utilization of the image of just a body instead of the body portion whose position moving is large such as hand and foot.

Even if the position, size and rotation angle of the target object are not correct, the work volume which creates the learning data can be reduced substantially when it can be learned automatically and appropriately. One of such learning schemes is disclosed in the non patent literature 1.

A method disclosed in the non patent literature 1 is called Multiple Instance Learning Boosting. In this method, a large number of image templates obtained by perturbing the position, size and rotation angle concerning to a certain target are prepared. Learning processing is performed using the set (hereinafter, it is described as a bag) of these image templates. The method described in the non patent literature 1 learns by the evaluation measure based on "the probability that no smaller than one among a large number of image templates in the bag is an image template of the object based on the correct position, size and rotation angle". Even if the image template based on the position, size and rotation angle that are not correct is included in the set of the image templates, the method described in the non patent literature 1 automatically finds and learns the common characteristics among the bags in the process of the learning processing. In other words, it can be understood that the method described in the non patent literature 1 performs the learning processing with choosing the characteristics that the position, size and rotation angle of the object arranged automatically.

Various learning methods exist in a statistical pattern recognition technical field. There is a learning method belonging to the kind that is called the ensemble type as one kind of those. In this method, the final discriminated result is obtained by combining a plurality of discriminators called a weak discriminator. In this method, a series of discrimination processing composed of the combination of the discrimination performed with the weak discriminators called weak discriminators and the final discrimination is assumed to be performed by single discriminator. One discriminator which performs a series of its discrimination processing is called strong discriminator. The characteristic of this method is the point that the high discrimination precision can be obtained from the view point of the strong discriminator even if the discrimination precision of each weak discriminator is not always high. A method which has improved the ensemble type learning method called "boosting" is adopted in the non patent literature 1.

On the other hand, the method described in a patent literature 1 is one kind of statistical pattern recognition methods called learning vector quantization (LVQ). In order to understand the present invention easily, the patent literature 1 is described as related art of the present invention. Although the method itself of the LVQ is not the ensemble type learning method, a concept close to the ensemble learning is dealt with in this patent literature 1.

The method described in the patent literature 1 selects sequentially and adds the effective dimension for the discrimination concerning to the characteristics vector of the pattern. For this reason, the method described in the patent literature 1 performs the discrimination by a low dimension vector at first and then performs the discrimination by the high dimension vector whose dimension has been added. In case of this method, if the discrimination by the added characteristics dimension is regarded as the weak discriminator, it can be regarded as a kind of the ensemble type learning methods because it can be assumed to compose a strong discriminator by the combination of the weak discriminator groups.

In addition, as the technology in relation to the present invention, the learning methods using a sample image are disclosed in a patent literature 2 and a patent literature 3.

CITATION LIST

Non Patent Literature

[NPL 1]
Paul Viola, John C. Platt, and Cha Zhang work "Multiple Instance Boosting for Object Detection" In NIPS 18 and 1419-1426 page, MIT Press and 2006

Patent Literature

[PLT 1]
Japanese Patent Application No. 2009-022898
[PLT 2]
Japanese Patent Application Laid-Open No. 2005-250773
[PLT 3]
Japanese Patent Application Laid-Open No. 2007-226512

SUMMARY OF INVENTION

Technical Problem

However, in the above-mentioned related art, when the visible perturbation of the target object is in variety, the sufficiently high discrimination precision cannot be obtained. For example, the technology described in the non patent literature 1 is using the evaluation measure based on the probability as "the probability that any no smaller than one of the image templates in the bag are the precise position, size and rotation angle of the object" in the learning processing. For this reason, although the technology described in the non patent literature 1 maximizes the likelihood which is the evaluation measure for the object with various visible perturbations, it cannot focus on the common characteristics among bags and cannot learn the characteristics that the target objects have in common as a result.

An exemplary object of the present invention to provide a learning apparatus, a learning system and a learning program for the object discrimination, which enable to get the high discrimination precision even if the visible perturbation is the various object.

Solution to Problem

In order to achieve the object mentioned above, a learning apparatus according to the present invention includes a weak discriminator generation means for generating a weak discriminator which calculates a discrimination score that shows whether a target instance of is a positive instance based on the feature extracted from a plurality of bags and a bag label which is information whether each bag is a positive bag or a negative bag, a weak discrimination means for calculating the discrimination score based on the weak discriminator generated by the weak discriminator generation means, an instance probability calculation means for calculating a probability (instance probability) that the target instance is an instance (positive instance) of the correct target object based on the discrimination score calculated by the weak discrimination means, a bag probability calculation means for calculating a probability (bag probability) that no smaller than two positive instances are included in the bag based on an instance probability calculated by the instance probability calculation means, and a likelihood calculation means for calculating the likelihood which expresses plausibility of the calculated bag probability in the bag probability calculation means based on the bag label.

In order to achieve the aim mentioned above, a learning system includes a memory means and the learning apparatus, wherein the memory means includes a feature memory means for holding the feature that has been extracted from a plurality of bags concerning to the set (positive bag) of a large number of perturbed instances and the set (negative bag) of the instances which is not a positive bag concerning to the target instance which includes no smaller than two instances (positive instance) of the correct target object, and a bag label memory means for holding a bag label which is the information whether each bag is a positive bag or a negative bag, and wherein the learning apparatus includes the weak discriminator generation means generates the weak discriminator based on the feature that the feature memory means holds and a bag label which the bag label memory means holds, the likelihood calculation means calculates the likelihood with targeting for a plurality of bags used for learning based on a bag label which the bag label memory means holds, a weak discriminator selecting means for selecting a weak discriminator based on the likelihood calculated by the likelihood calculation means, and the memory means includes a parameter memory means storing a parameter concerning to a weak discriminator selected by the weak discriminator selecting means.

In order to achieve the aim mentioned above, a learning method includes generating a weak discriminator which calculates a discrimination score that indicates whether a target instance is a positive instance or not, based on a feature extracted from a plurality of bags and a bag label which is the information whether each bag is a positive bag or negative bag, calculating the discrimination score based on the generated weak discriminator, calculating a probability (instance probability) that a target instance is an instance (positive instance) of the correct target object based on the calculated discrimination score, calculating a probability (bag probability) that no smaller than two positive instances are included in the bag based on the calculated instance probability, and calculating the likelihood representing plausibility of the calculated bag probability based on the bag label.

In order to achieve the aim mentioned above, a computer-readable storage medium storing a learning program to make a computer execute a processing, includes generating a weak discriminator which calculates a discrimination score that indicates whether a target instance is a positive instance or not, based on a feature extracted from a plurality of bags and a bag label which is information whether each bag is a positive bag or negative bag, calculating the discrimination score based on the generated weak discriminator, calculating a probability (instance probability) that a target instance is an instance (positive instance) of a correct target object based on the calculated discrimination score, calculating a probability (bag probability) that no smaller than two positive instances are included in the bag based on the calculated instance probability, and calculating the likelihood representing plausibility of the calculated bag probability based on the bag label.

Advantageous Effects of Invention

According to a learning apparatus for object discrimination in the present invention, a learning system, learning method and a learning program, even if a visible perturbation is a various object, the high discrimination precision can be obtained.

DESCRIPTION OF EMBODIMENTS

First, in order to understand the present invention easily, the related art of the present invention will be described in detail.

In the non patent literature 1, the example which is the target object is called "positive" while the example which is not target object is called "negative". The image template of target object with the correct position, size and rotation angle is called "positive instance" while the image template of target object which is not correct and the image template which is not target object are called "negative instance". Further, a word of instance may indicate an image template itself and a feature template that has converted the image template to the optional feature.

Figure 1:
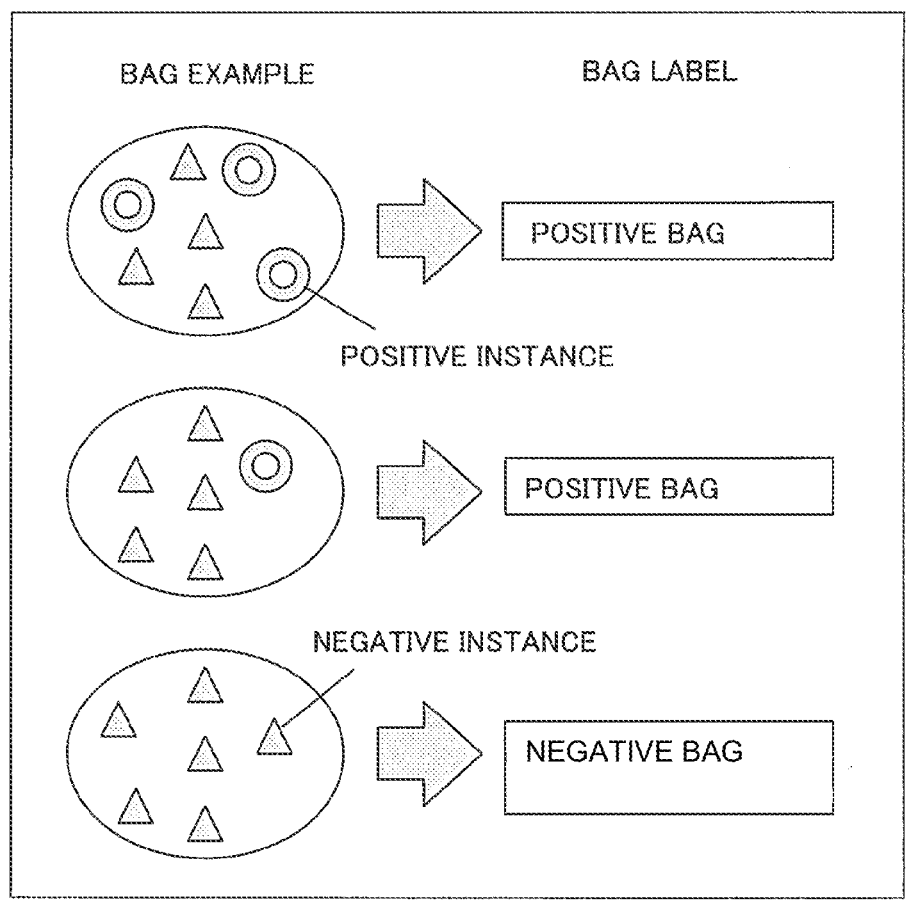
FIG. 1 shows a conceptual diagram of the positive bag and the negative bag in the non patent literature 1.

In the non patent literature 1, the bag is called "positive bag" if at least one positive instance exists in the bag while the bag is called "negative bag" if only the negative instance exists in the bag. FIG. 1 is a conceptual diagram of the positive bag and the negative bag in the non patent literature 1. The information whether the bag is positive or negative is called "bag label".

Figure 2:
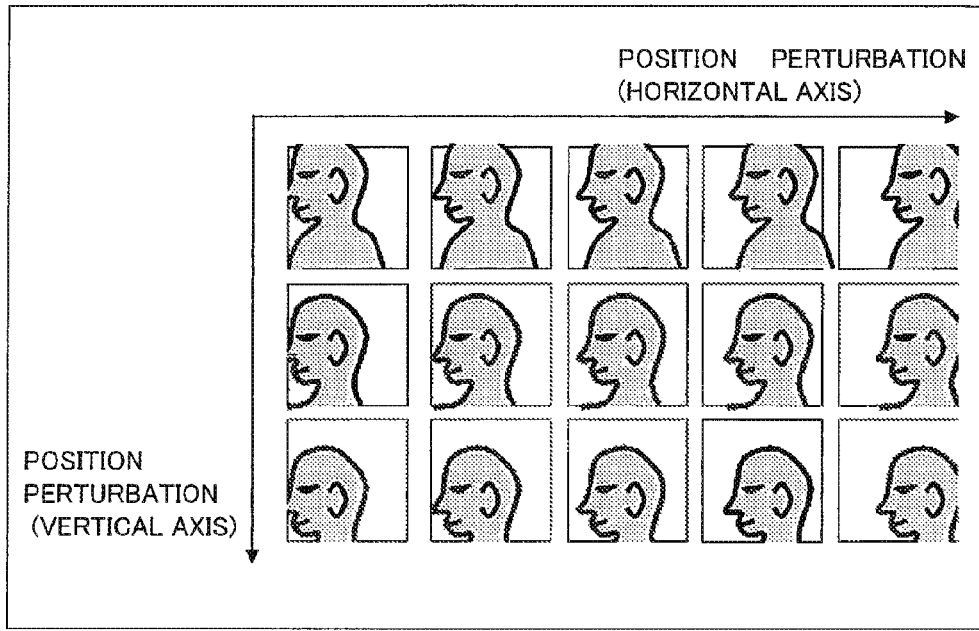
FIG. 2 is a figure which illustrates "an image template which is cut down with the perturbation concerning to the position".
Figure 3:
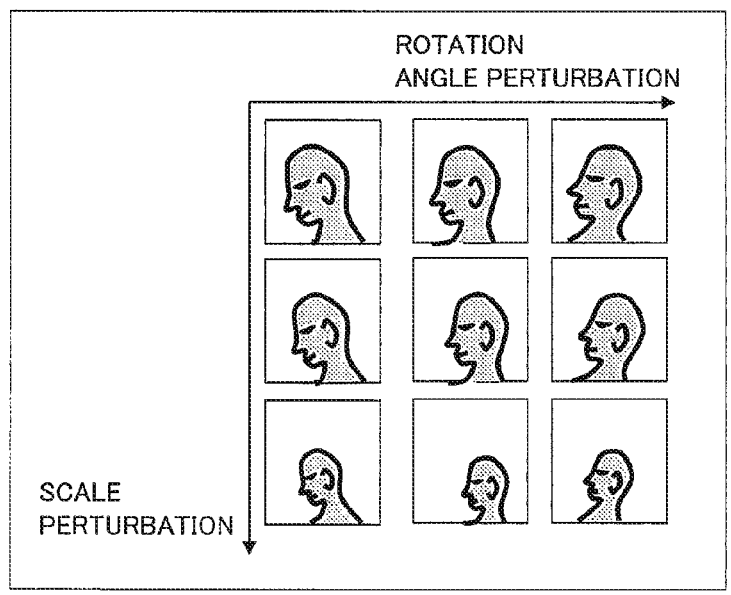
FIG. 3 is a figure which illustrates "an image template which is cut down with the perturbation concerning to the scale and rotation angle".

FIG. 2 and FIG. 3 are figures which illustrates "An image template which is made by cutting down with the perturbation". Specifically, FIG. 2 is a figure which illustrates "an image template which is made by cutting down with the perturbation concerning to the position". FIG. 2 indicates the set of the image template which made a horizontal direction and a longitudinal direction perturb the image template of target object. In FIG. 2, the vertical axis indicates "The perturbation in the position of the longitudinal direction". The horizontal axis indicates "the perturbation in the position of the horizontal direction". FIG. 3 is a figure which illustrates "An image template which is made by cutting down with the perturbation concerning to the scale and rotation". FIG. 3 indicates a set of the image templates which is made by perturbation the image template of the target object concerning to the rotation angle and the scale. In FIG. 3, the vertical axis indicates "The scale perturbation", while the horizontal axis indicates "The rotation angle perturbation". As shown in FIGS. 2 and 3, the positive bag is composed of an image template group which is made by cutting down with the perturbation for the position and the size or the like.

Figure 4:
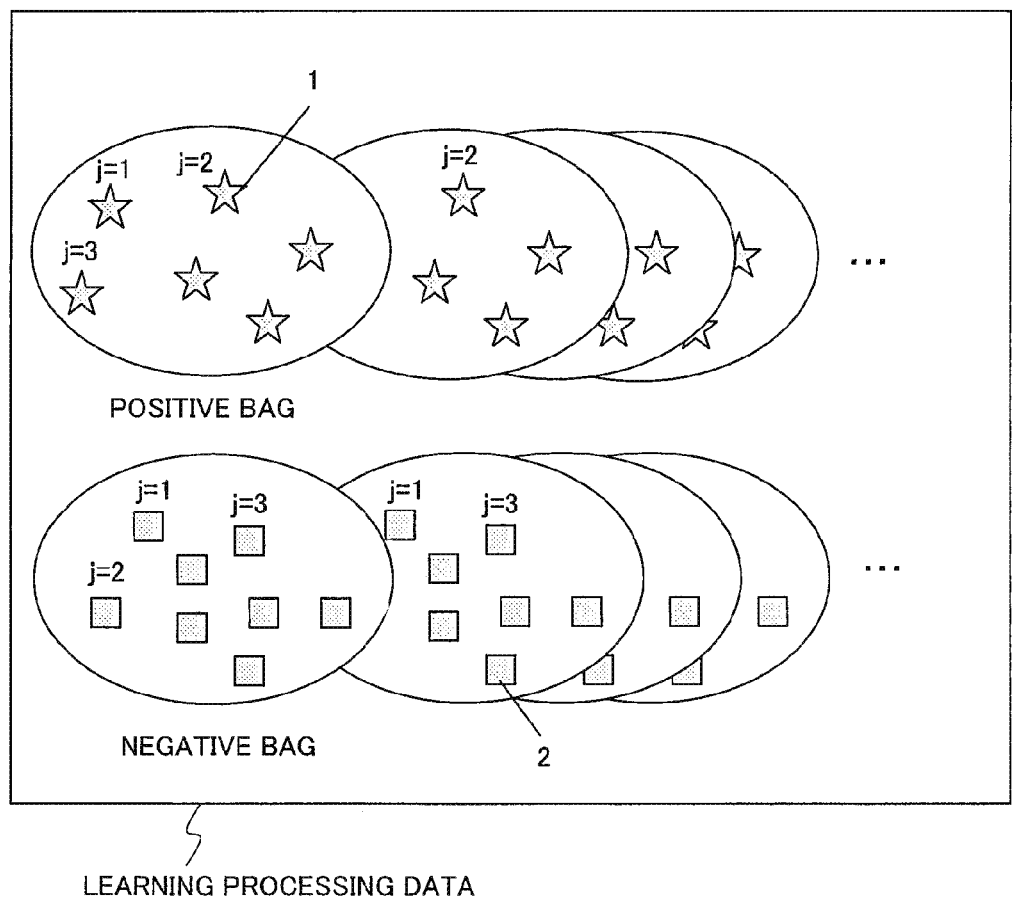
FIG. 4 is a figure which illustrates the data used for the learning processing of the object discrimination.

FIG. 4 is a figure which illustrates the data used for the learning processing of the object discrimination. In FIG. 4, 1 (Stellar mark) is an image template which is generated by perturbing the object image template. 2 (Square mark) is an image template which is generated from the other image templates than the object image.

As shown in FIG. 4, the data used for learning processing includes a positive bag which is the set of the image templates which are made by perturbing the image template of target object and a negative bag which is the set of the image templates which are generated from other image templates. When learning actually, a plurality of the positive bags and no smaller than one negative bag are used.

A computing procedure in the learning processing of a non patent literature 1 will be described below. When the probability that i-th image template in i-th bag is the target object is set to Pij and the probability that no smaller than one image template in the bag is the target object is set to Pi, Pi is calculated by Formula 1.

$$P_i = 1 - \left\{ \prod_j \{1 - P_{ij}\} \right\}$$ (Formula 1)

When the evaluation measure which evaluates plausibility of the discrimination result is made L, L is defined by Formula 2.

$$L = \Pi p_i^{t_i}(1-p_i)^{(1-t_i)}$$ (Formula 2)

ti is a variable which becomes 1 when no smaller than one of the target objects are included in i-th bag and becomes 0 otherwise. The technology described in the non patent literature 1 requests a learning parameter so that the likelihood expressed in above-mentioned L may be maximized. The definition of the words given in the non patent literature 1 is used with the similar meaning in the explanation of the embodiment described below according to the present invention there is no special declining.

Hereinafter, the embodiment of the present invention will be described. Further, each unit in each apparatus of which a learning system of each embodiment is composed includes a control unit, memory, a program loaded in the memory, a memory unit such as a hard disc storing the program and a network connection interface and is realized by an arbitrary combination of the hardware. As far as there is no special declining, the realization method and its apparatus are not limited.

A control unit is composed of CPU (Central Processing Unit hereinafter, it is similar) and so on and controls the whole of each apparatus of the learning system by working the operation system. The control unit reads a program and data from a recording medium loaded on a drive apparatus to the memory, for example, and carries out the various processing according to this.

The recording media is such as an optical disc, for example, a flexible disc, a magnetic optical disc, an external hard disk and a semiconductor memory, and the computer program is recorded so that it may be readable by computer. The computer program may be downloaded from an external computer not shown which is connected to a communication network.

The block diagram used in a description of each embodiment indicates not the composition of the hardware unit but a block of the function unit. These function blocks are realized by the arbitral combinations of the hardware. In these figures, although it may be described so that the formation unit of each embodiment may be realized by one apparatus which has combined physically, the realization unit is not limited in particular. That is, it may realize the system of each embodiment with a plurality of these apparatus by connecting two or more physically separated apparatus by wire or wireless and realize a system of each embodiment.

The First Exemplary Embodiment

Figure 5:
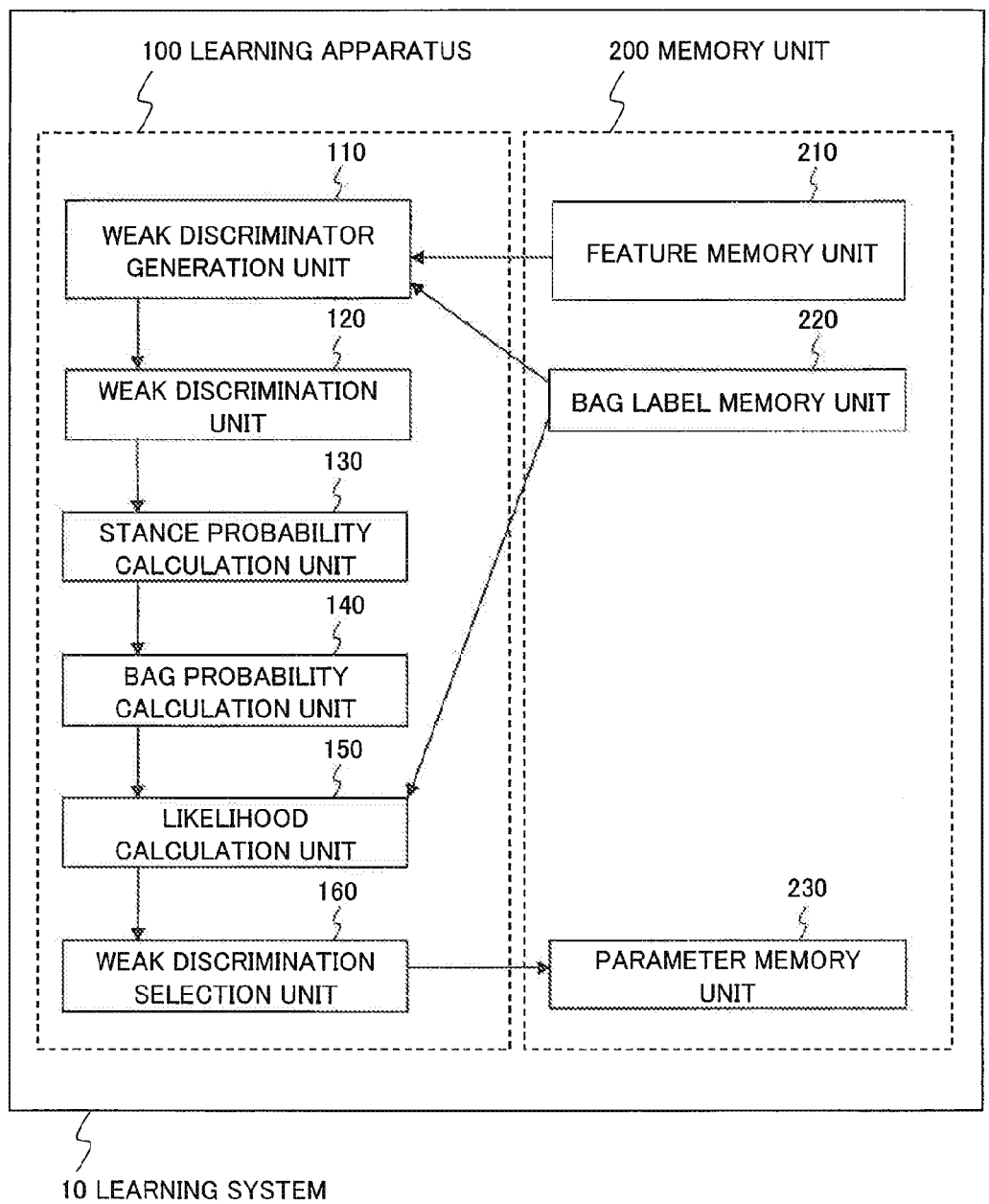
FIG. 5 is a block diagram which shows the functional constitution of a learning system in the first exemplary embodiment of the present invention.

FIG. 5 is a block diagram which shows a functional constitution of a learning system 10 in the first exemplary embodiment of the present invention. As shown in FIG. 5, the learning system 10 includes a learning apparatus 100 and a memory unit 200. The learning apparatus 100 includes a weak discriminator generation unit 110, a weak discrimination unit 120, an instance probability calculation unit 130, a bag probability calculation unit 140, a likelihood calculation unit 150 and a weak discriminator selection unit 160. The memory unit 200 includes a feature memory unit 210, a bag label memory unit 220 and a parameter memory unit 230.

First, each memory unit which the memory unit 200 includes will be described.

The feature memory unit 210 holds an instance used for learning in advance. In this exemplary embodiment, the instance used for learning is the data which have been converted from a image template into the optional feature, and is included in a positive bag or a negative bag. That is, the feature memory unit 210 holds the feature that has been extracted from a plurality of bags concerning to the set (positive bag) of a large number of perturbed image templates and the set (negative bag) of the image template which is not a positive bag concerning to an image template of target object which includes no smaller than two image templates (positive instance) of the correct target object.

The bag label memory unit 220 holds the bag label which is the information whether each bag used for the learning is a positive bag or a negative bag is held, in advance.

The parameter memory unit 230 stores a parameter concerning to a weak discriminator selected in the weak discriminator selection unit 160. Concretely, the parameter concerning to the weak discriminator is the used feature, the value that determines the weak discrimination procedure or the threshold value and is different depending on the discrimination methods of the weak discriminator.

Next, each configuration that the learning apparatus 100 includes will be described.

The weak discriminator generation unit 110 generates a weak discriminator based on the feature that the feature memory unit 210 holds and a bag label which the bag label memory unit 220 holds. This weak discriminator calculates the discrimination score that shows whether the target instance is a positive instance. The generated weak discriminator may be an optional discriminator which performs the two class discrimination using one kind or a plurality of the features.

The weak discrimination unit 120 performs the discrimination processing of an image template based on a weak discriminator generated by the weak discriminator generation unit 110 and calculates the discrimination score.

The instance probability calculation unit 130 calculates the probability (instance probability) Pij where the target instance is a positive instance based on the discrimination score calculated by the weak discrimination unit 120. For example, the instance probability Pij may be calculated by Formula 3.

$$P_{ij} = \frac{1}{1+e^{-\alpha s_{ij}+\beta}} \quad \text{(Formula 3)}$$

In the Formula 3, i is the number of the bag and j is the number of the instance. Sij is the discrimination score found by a weak discriminator. The coefficient α and β may be estimated in an approximate manner based on the actual or may be the fixed numbers. Further, Pij should mathematically satisfy the condition as the probability even if the calculation method is other than the calculation according to Formula 3 such as the conversion based on a table in which the quantized score probability value is mapped in 1 to 1.

The bag probability calculation unit 140 calculates the probability that the bag is positive from the value of the instance probability of all instances in one bag calculated in the instance probability calculation unit 130. However, "The bag is positive." is the case that two or more among the instances in the bag are positive instances. That is, the bag probability calculation unit 140 calculates the probability (bag probability) that two or more positive instances are included in the bag based on the instance probability calculated in the instance probability calculation unit 130. For example, the bag probability calculation unit 140 may calculate the bag probability by Formula 4.

$$P_i = 1 - \left[\prod_j \{1-P_{ij}\} + \sum_{k=1} \prod_{j=1} Q_{kj}\right] \quad \text{(Formula 4)}$$

$$Q_{kj} = \begin{cases} P_{ij} & \text{if } k=j \\ 1-P_{ij} & \text{if } k \neq j \end{cases}$$

In the Formula 4, the first term in the large parenthesis of the right side is the probability that any instances are not positive instances while the second item is the probability that only one instance is a positive instance. It can be said that Pi in the Formula 4 expresses the probability that two or more instances are positive instances by subtracting the first term and the second item from 1.

The likelihood calculation unit 150 calculates the likelihood L which expresses the plausibility of the bag probability of a plurality of bags which are used for learning that is calculated in the bag probability calculation unit 140 based on the bag label which the bag label memory unit 220 holds. For example, L may be calculated by Formula 5.

$$L = \Pi p_i^{t_i}(1-p_i)^{(1-t_i)} \quad \text{(Formula 5)}$$

Wherein, ti takes the following value.

$$t_i = \begin{cases} 1 & \text{if positive bag} \\ 0 & \text{else} \end{cases}$$

However, L may be converted by a monotonically increasing function such as a logarithmic function furthermore, since only the plausibility should be expressed. In addition, it may be converted by a monotonically decreasing function. In this case, a weak discriminator selection unit 160 mentioned after may select the case that the value becomes minimum instead of the case that the value bets maximum. In this exemplary embodiment, it is supposed that the height of the likelihood represents the height of plausibility.

The weak discriminator selection unit 160 selects a weak discriminator based on likelihood calculated in the likelihood calculation unit 150. That is, the weak discriminator selection unit 160 selects the weak discriminator in which the likelihood calculated in the likelihood calculation unit 150 is the highest. The weak discriminator selection unit 160 stores the parameter concerning to the selected weak discriminator in the parameter memory unit 230.

Figure 6:
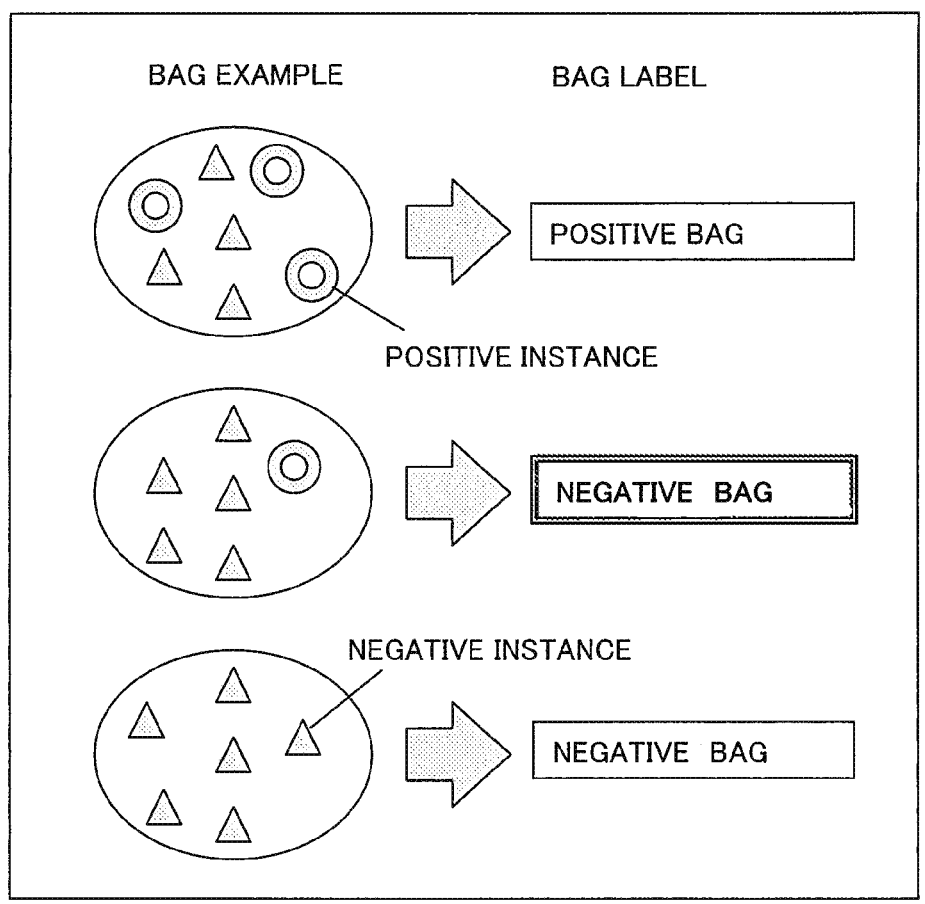
FIG. 6 is a conceptual diagram of the positive bag and the negative bag in the first exemplary embodiment of the present invention.

Next, the definition of "bag label" in the first exemplary embodiment of the present invention will be described. FIG. 6 is a conceptual diagram of the positive bag and the negative bag in the first exemplary embodiment of the present invention. As shown in FIG. 6, in the first exemplary embodiment of the present invention, the bag is called "positive bag" if no smaller than two positive instances exist in the bag while the bag called "negative bag" if the number of the positive instances in the bag is no more than one.

Next, the whole operation of the learning system 10 will be described in detail with reference to a flow chart on FIG. 5 and FIG. 7.

Figure 7:
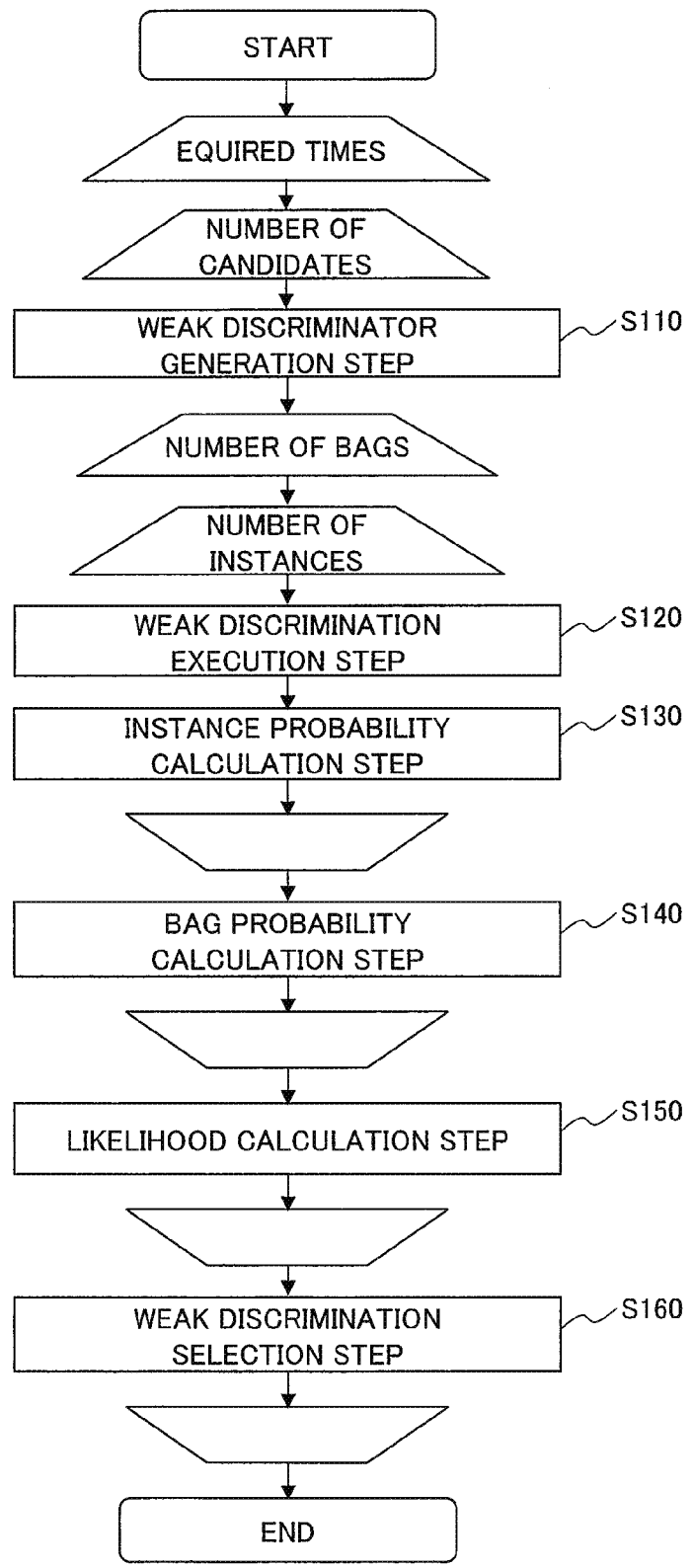
FIG. 7 is a flow chart which shows the operation of a learning system in the first exemplary embodiment of the present invention.

FIG. 7 is a flow chart which shows the operation of the learning system 10 in the first exemplary embodiment of the present invention. As shown in FIG. 7, first, the weak discriminator generation unit 110 generates one weak discriminator based on the feature that the feature memory unit 210 holds and a bag label which the bag label memory unit 220 holds [weak discriminator generation step (Step S110)]. The weak discriminator is an optional discriminator that performs the two class discrimination using one kind or a plurality of the features. Further, whether a certain weak discriminator is finally used depends on the result of step S160 mentioned after and the discrimination precision of individual weak discriminator is not needed to be high.

Next, the weak discrimination unit 120 performs the weak discrimination concerning to one instance and gets the discrimination score [weak discrimination execution step (Step S120)]. The discrimination score may be the dual value of 0 or 1, or may be a real number, for example.

Next, the instance probability calculation unit 130 calculates the probability that the instance is a positive instance in other words the probability that it is the target object with the correct position, size and rotation angle (instance probability) [instance probability calculation step (Step S130)].

Further, Step S120 and Step S130 are carried out repeatedly only for all instances in one bag.

Next, for example, the bag probability calculation unit 140 calculates the probability that the bag is positive in other words the probability that no smaller than two among the instances in the bag are positive instances (bag probability) based on the Formula 4 [bag probability calculation step (Step S140)].

Further, the processing to Steps S120 to S140 is carried out repeatedly only for all numbers of bag.

Next, the likelihood calculation unit 150 calculates the plausibility (likelihood) L which is calculated based on the probability concerning to all bags used for the calculated learning processing to step S140 and the bag label memorized in the bag label memory unit 220 [likelihood calculation step (Step S150)]. For example, as mentioned before, the likelihood calculation unit 150 may calculate L by the Formula 5.

Further, the processing to Steps S110 to S150 is carried out repeatedly concerning to all weak discriminator candidates generated in a weak discriminator generation step. However, it is removed concerning to a weak discriminator selected in Step S160 mentioned after. In other words, the processing to Steps S110 to S150 is carried out repeatedly concerning to what is not selected among all weak discriminator candidates.

Next, the weak discriminator selection unit 160 selects the weak discriminator of the highest likelihood concerning to likelihood of the weak discriminator calculated by the processing to Step S150, and stores a parameter concerning to a weak discriminator in the parameter memory unit 230 [weak discriminator selection step (Step S160)].

Further, the processing to Steps S110 to S160 is repeated until the predetermined number of times or the predetermined discrimination precision as a strong discriminator is reached. The predetermined times may be the times determined in advance or the times may be determined by the upper limit of the learning processing time. For example, the predetermined discrimination precision may be set so that both of the dual value of the error acceptance rate of regarding the negative instance to be a positive instance and the error reject rate of regarding the positive instance to be a negative instance may fall below the threshold value.

As it has been described above, the learning system 10 in the first exemplary embodiment of the present invention calculates a probability that no smaller than two among instances in one bag are positive instances. In other words, the learning system 10 calculates the probability (bag probability) that the position, size and rotation angle of no smaller than two image templates in the perturbed image template group corresponding to one bag are correct. Even if the visible perturbation is the various objects, the learning system 10 can provide the learning possible to obtain the high discrimination precision since it is constructed to have the learning processing based the calculated bag probability.

The reason is that a plurality of templates with the almost correct position, size and rotation angle exists if the perturbation is not rough since the positive bag is composed of only the perturbed image templates. Therefore, according to the learning system 10 in the first exemplary embodiment of the present invention, the weak discriminator which have used the common features among bags themselves is easy to be selected by maximizing the likelihood that is the evaluation measure of the probability that the bag includes two or more positive instances even in the case that the discrimination id difficult such as the discrimination concerning to the various objects with the visible perturbation.

The Second Exemplary Embodiment

The learning system according to the second exemplary embodiment of the present invention differs from the first exemplary embodiment in the point that the bag probability calculation unit is the conditional bag probability calculation unit that calculates the bag probability which satisfies the specific condition.

Figure 8:
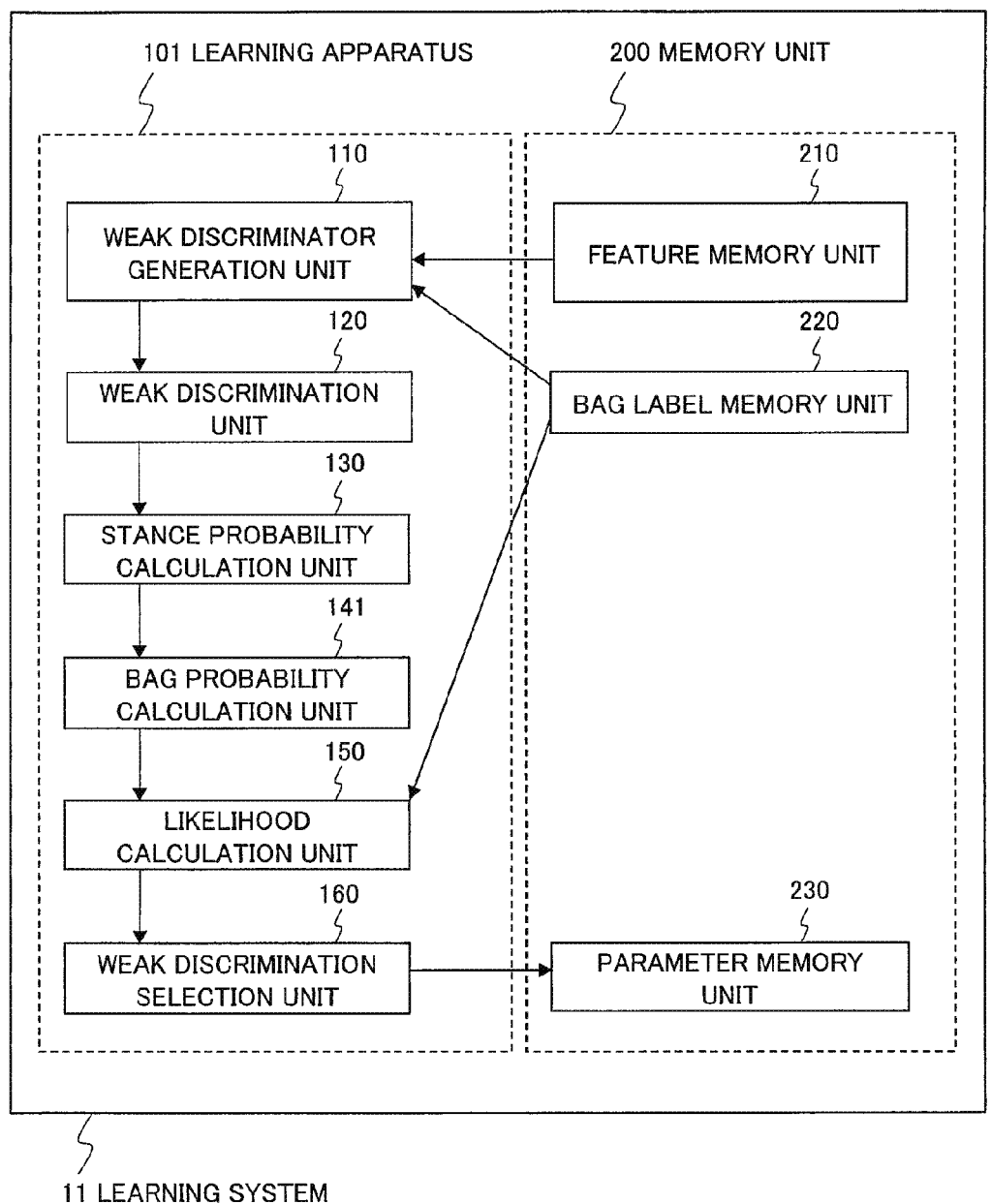
FIG. 8 is a block diagram which shows the functional constitution of a learning system in the second exemplary embodiment of the present invention.

FIG. 8 is a block diagram which shows the functional constitution of the learning system 11 in the second exemplary embodiment of the present invention. As shown in FIG. 8, the learning system 11 includes a learning apparatus 101 and a memory unit 200.

Although a learning apparatus 101 is almost the same as the learning apparatus 100 in the learning system 10, it is different in the point that the bag probability calculation unit 140 is the conditional bag probability calculation unit 141 which calculates the bag probability which satisfies the specific condition. A memory unit 200 is the same composition as the memory unit 200 of the learning system 10 in the first exemplary embodiment.

A conditional bag probability calculation unit 141 calculates the probability that the bag is positive from the probability values of all instances in one bag calculated in the instance probability calculation unit 130. However, "A bag is positive." means that two or more instances that satisfy the specific condition out of the instances in the bag are the positive stances in this exemplary embodiment. The specific condition is that the perturbation degree concerning to the position, size and rotation angle of the image template corresponding to an instance is close.

Figure 9:
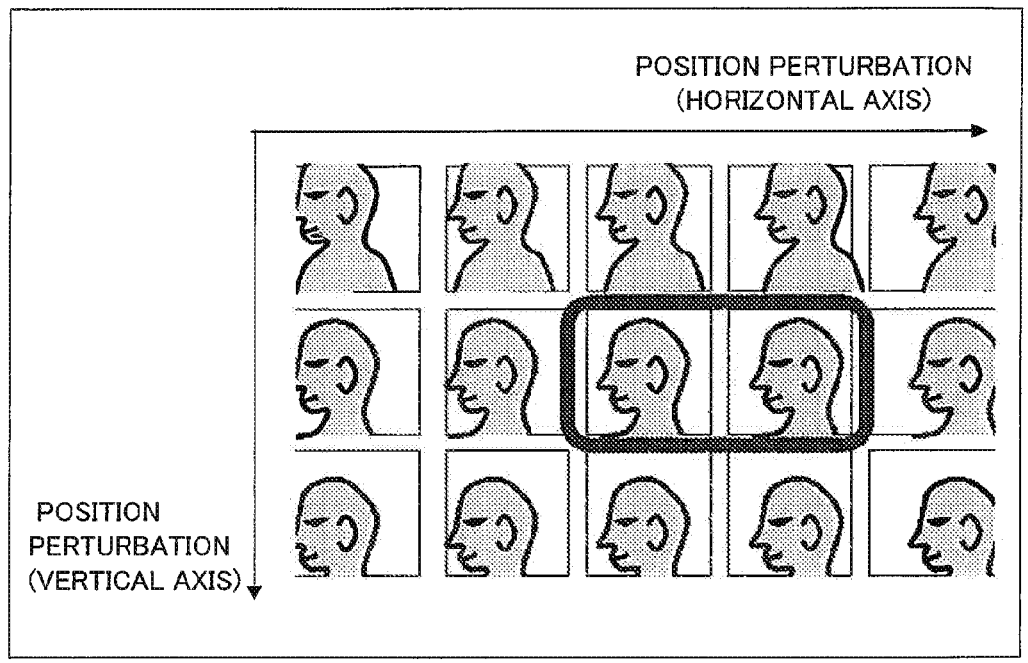
FIG. 9 is a figure which illustrates "The perturbation degree is close concerning to the position."
Figure 10:
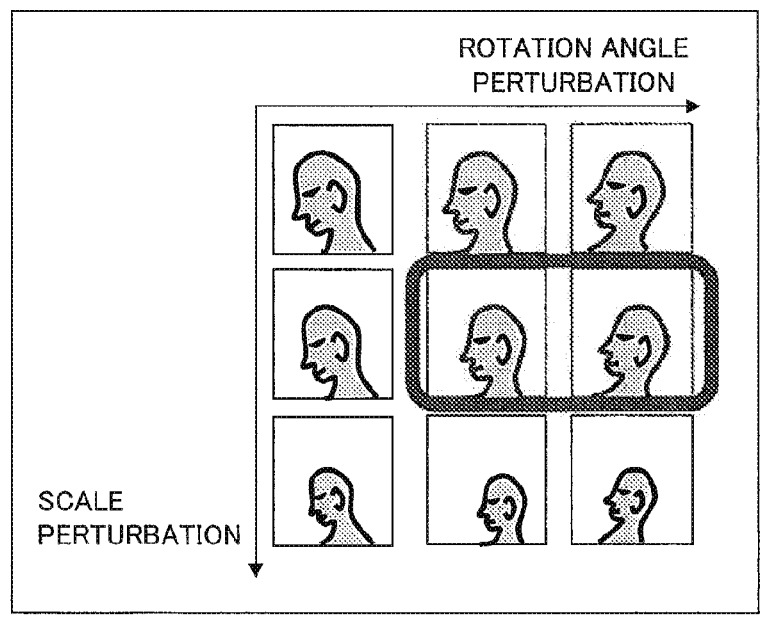
FIG. 10 is a figure which illustrates "The perturbation degree is close concerning to the scale and rotation angle."

"The perturbation degree is close" will be described in detail with reference to FIG. 9 and FIG. 10. FIG. 9 is a figure which illustrates "Concerning to the position, the perturbation degree is close." FIG. 10 is a figure which illustrates "Concerning to the scale rotation angle, the perturbation degree is close." As shown in FIG. 9 and FIG. 10, for example, "The perturbation degree is close." corresponds to the relation between two adjacent image templates surrounded with a thick frame in FIG. 9 and FIG. 10. Thus, it is defined as "A bag is positive." in this exemplary embodiment that two instances with the close perturbation degree are positive instances at the same time.

Figure 11:
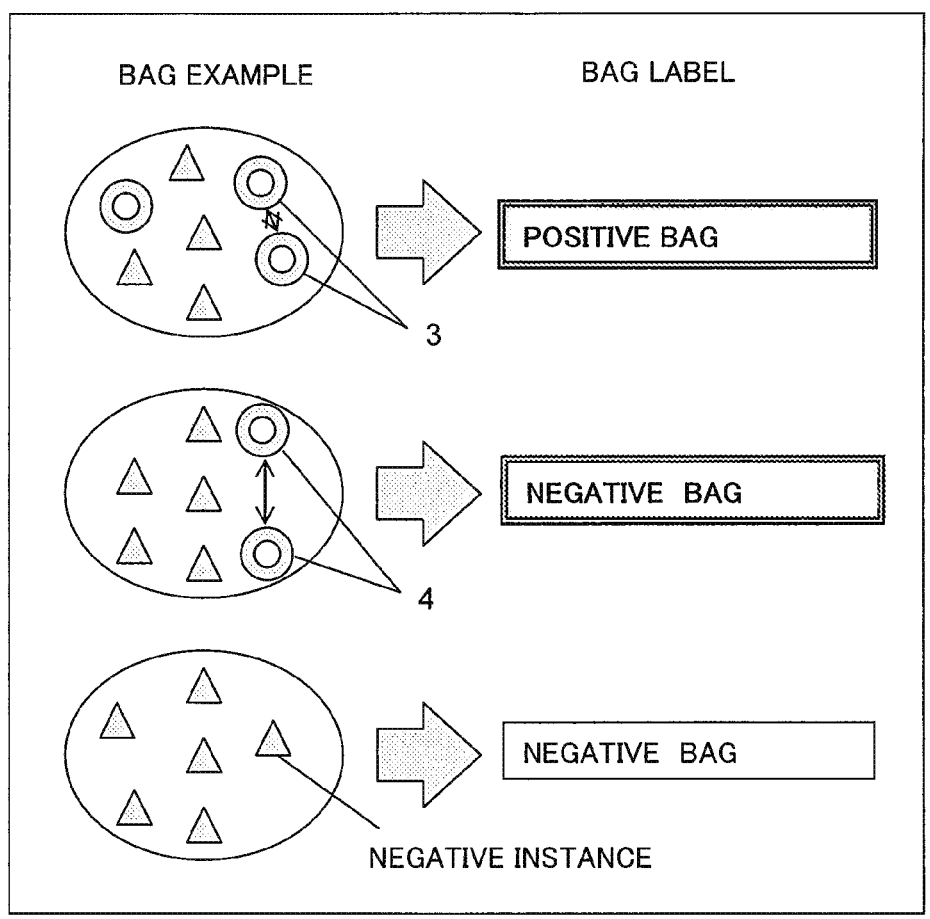
FIG. 11 is a conceptual diagram of the positive bag and the negative bag in the second exemplary embodiment of the present invention.

Next, the definition of "bag label" in the second exemplary embodiment of the present invention will be described. FIG. 11 is a conceptual diagram of the positive bag and the negative bag in the second exemplary embodiment of the present invention. In FIG. 11, 3 is an example of the positive instance with the close perturbation degree. 4 is an example of the positive instance which the perturbation degree is not close.

As shown in FIG. 11, according to the second exemplary embodiment of the present invention, no smaller than two positive instances exist in the bag, and the bag is called "Positive bag" in the case that the perturbation degree of the image template corresponding to the positive instance is close. Even if no smaller than two positive instances in the bag exist, when the perturbation degree is not close, the bag is called "negative bag".

Figure 12:
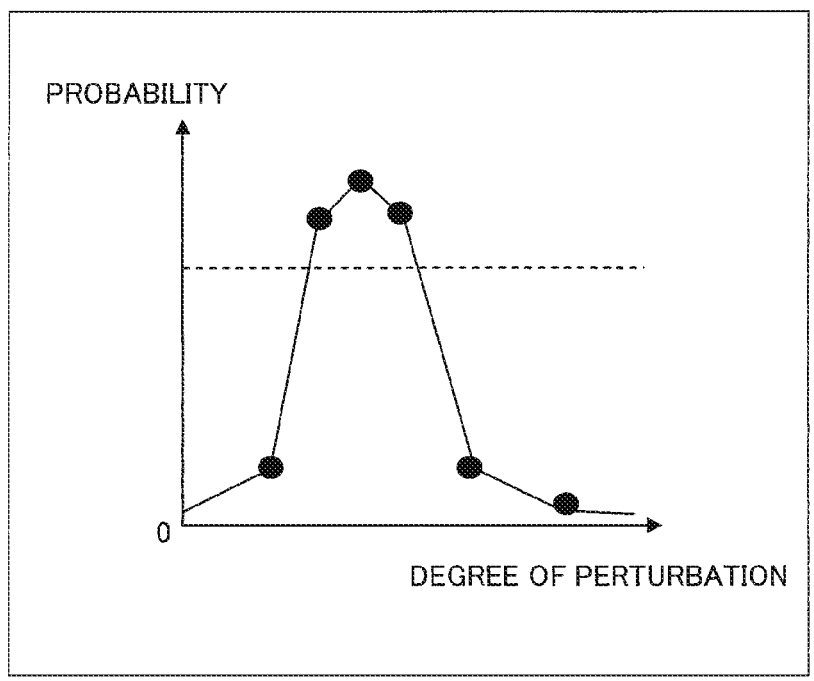
FIG. 12 is a figure which illustrates the relation between the perturbation degree and a probability that the instance is positive.

FIG. 12 is a figure illustrating a relation between the perturbation degree and a probability that an instance is positive. As shown in FIG. 12, because the bag which actually performs the learning processing includes only a perturbed image template, a plurality of templates of the almost correct position, size and rotation angle always exist, and it has the property that the perturbation degree is close between those templates if the perturbation is not rough. In FIG. 12, the vertical axis indicates "the probability that the instance is positive". The horizontal axis indicates "the perturbation degree".

The conditional bag probability calculation unit 141 calculates the probability (conditional bag probability) that no smaller than two positive instances included in the bag are no smaller than two instances with the close perturbation degree based on the property mentioned above.

The conditional bag probability calculation unit 141 may calculate the conditional bag probability by Formula 6.

$$P_i = 1 - \left\{ \prod_j \{1 - P_{ij}\} + \sum_{k=1} \prod_{j=1} Q_{kj} + R \right\} \quad \text{(Formula 6)}$$

$$Q_{kj} = \begin{cases} P_{ij} & \text{if } k = j \\ 1 - P_{ij} & \text{if } k \neq j \end{cases}$$

In the Formula 6, the third item R in the large parenthesis of the right side is the probability that two instances which the perturbation degree is not closer are positive instances. In other words, it can be said that Pi in the Formula 6 expresses the probability that no smaller than set of two positive instances with the close perturbation degree exist. If the perturbation degree represents the probability that two instances which are not close are positive instances, R may express it in every kind of Formula.

In this exemplary embodiment, the likelihood calculation unit 150 calculates the likelihood L which expresses the plausibility of the bag probability of a plurality of bags which are used for calculated learning in the conditional bag probability calculation unit 141 based on a bag label which the bag label memory unit 220 holds.

Next, the whole operation of a learning system 11 will be described in detail with reference to a flow chart on FIG. 8 and FIG. 13.

Figure 13:
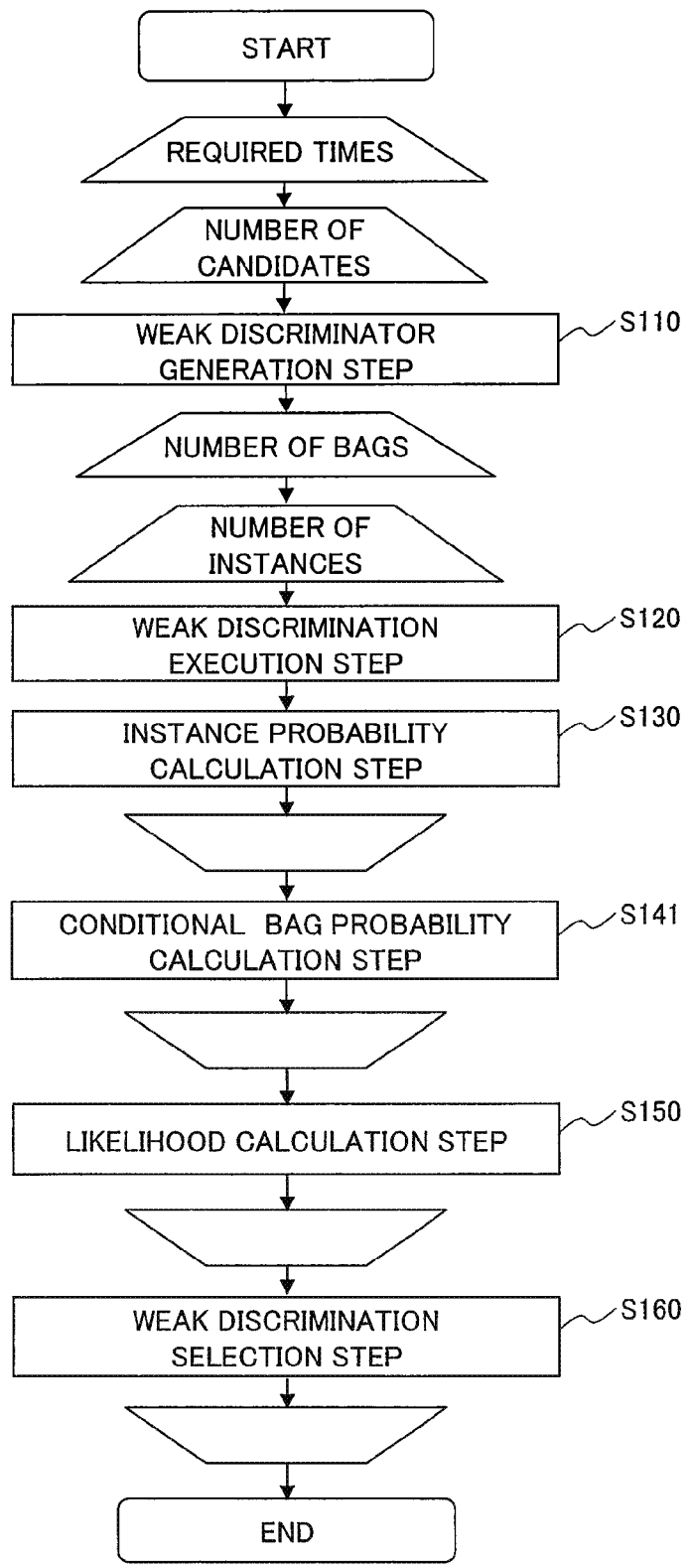
FIG. 13 is a flow chart which shows the operation of a learning system in the second exemplary embodiment of the present invention.

FIG. 13 is a flow chart which shows the operation of the learning system 11 in the second exemplary embodiment of the present invention. As shown in FIG. 13, although the operation of the learning system 11 is almost the same as the operation of the learning system 10, it is the different point that the operation in the step S140 in FIG. 7 is Step S141 (conditional bag probability calculation step).

The learning system 11 calculated the probability that the conditional bag probability calculation unit 141 is the positive bag instead of the operation of Step 140. In other words, for example, the conditional bag probability calculation unit 141 calculates the probability that two instances with the close perturbation degree in the bag are positive instances based on the Formula 6 [conditional bag probability calculation step (step S141)].

In a likelihood calculation step S150 in the learning system 11, likelihood calculation unit 150 calculates plausibility L of the calculated probability based on a probability concerning to all bags that it is to step S141 and it is used for calculated learning processing and a bag label stored in a bag label memory unit 220.

As it has been described above, a learning system 11 in the second exemplary embodiment of the present invention calculates a probability that two which the perturbation degree among the instance in one bag is near are positive instances. In other words, the learning system 11 calculates the probability (conditional bag probability) that the position, size and rotation angle of two image templates with the close perturbation degree in the perturbed image template group corresponding to one bag are correct. Because constituted so that the learning processing may be performed based on the calculated conditional bag probability, the learning system 11 can perform the learning capable of getting the high discrimination precision even if the visible perturbation is a various object.

This is the reason that a plurality of the templates with the almost correct position, size and rotation angle always exist within the range that the perturbation degree is close if the perturbation is not rough since the positive bag is composed of only perturbed image templates. Therefore, according to the learning system 11 in the second exemplary embodiment of the present invention, even if the discrimination such as the discrimination by which the visible perturbation relates to the various object is difficult, it is easy for the weak discriminator using the common features to be selected between the bags by maximizing the likelihood which is the measure for evaluation as a probability including no smaller than two positive instances with the close perturbation degree.

The Third Exemplary Embodiment

The third exemplary embodiment of the present invention is the discrimination system 20 which performs the discrimination processing of an object using a parameter learned by the learning system in first or second exemplary embodiment.

Figure 14:
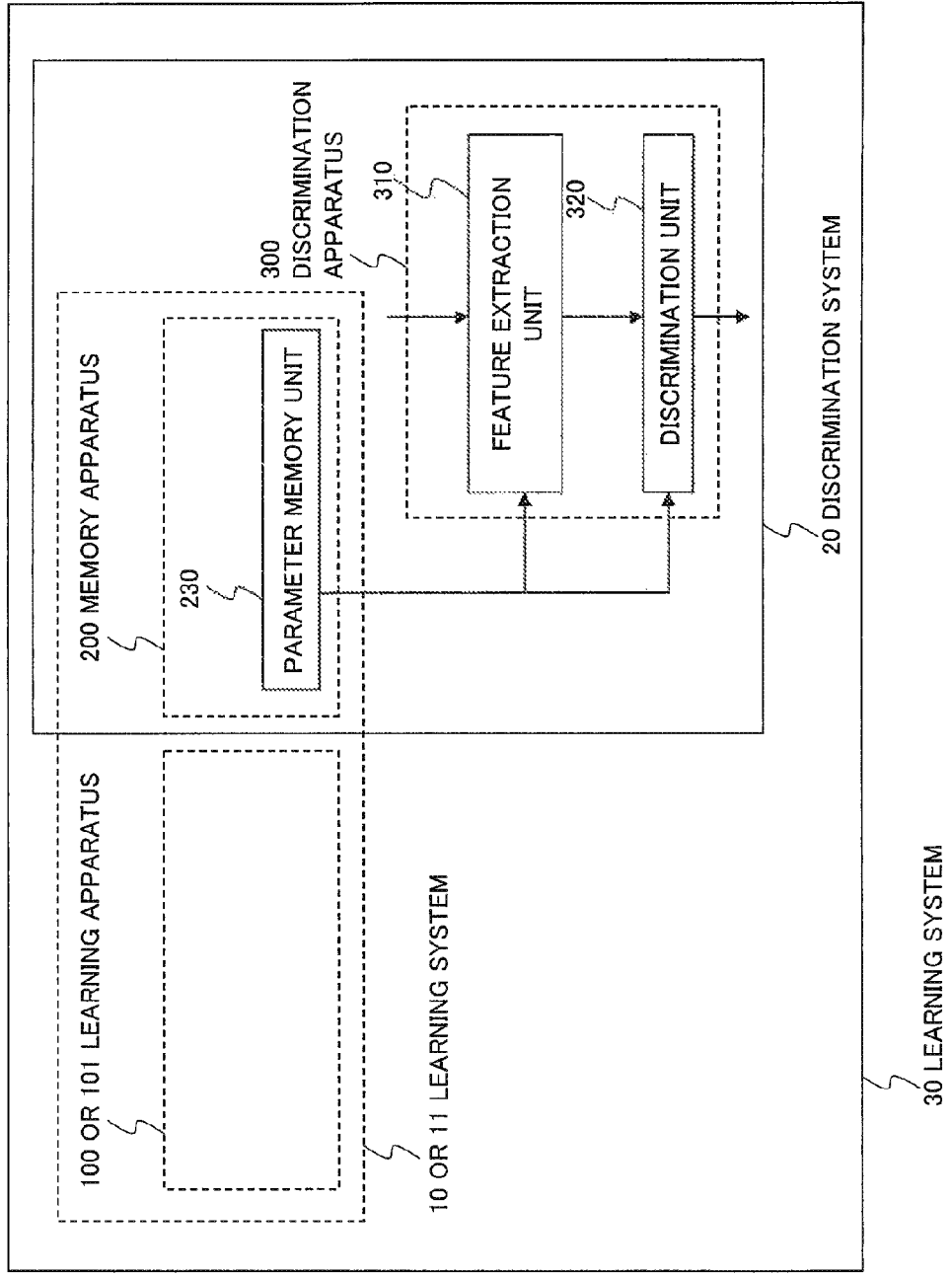
FIG. 14 is a block diagram which shows the related functional constitution of a discrimination system and a learning system in the third exemplary embodiment of the present invention.

FIG. 14 is a block diagram which shows the related functional constitution of a discrimination system and a learning system in the third exemplary embodiment of the present invention. As shown in FIG. 14, a discrimination system 20 includes a memory unit 200 which a learning system 10 or 11 includes and a discriminator 300. The description will be omitted concerning to learning systems 10 or 11 because it is the same configuration as the first or the second exemplary embodiment. As shown in FIG. 14, the whole system including the discrimination system 20 may be set with a learning system 30.

Then discriminator 300 includes a feature extracting unit 310 and a discrimination unit 320.

The feature extracting unit 310 extracts the feature from a target image for the discrimination.

The discrimination unit 320 discriminates an object in the image based on a parameter read from the parameter memory unit 230 concerning to the feature that the feature extracting unit 310 has extracted.

Next, the operation of discrimination system 20 will be described with reference to a flow chart on FIG. 14 and FIG. 15.

Figure 15:
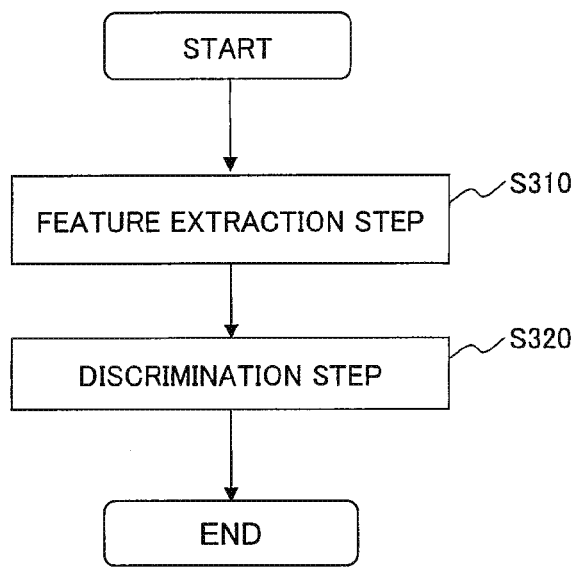
FIG. 15 is a flow chart which shows the discrimination system operation.

FIG. 15 is a flow chart which shows the operation of discrimination system 20. As shown in FIG. 15, first, a user inputs an image to discriminate to the feature extracting unit 310. The feature extracting unit 310 extracts the feature from a inputted target image for discrimination [feature extraction step (Step S310)].

The feature extracting unit 310 extracts the feature which is calculated by the same method as the feature stored in the feature memory unit 210 of the learning system 10 or 11 mentioned above. However, in a weak discriminator selection unit 160, only the feature that a selected weak discriminator requires may be extracted. The feature extracting unit 310 reads the information on which feature is needed from the parameter memory unit 230.

Next, the discrimination unit 320 discriminates the kind of the objects in the image based on a parameter read from the parameter memory unit 230 concerning to the feature extracted by the feature extracting unit 310 [discrimination step (Step S320)].

A method to discriminate the kind of these objects should be added to the method adopted by learning systems 10 or 11. For example, the patent literature 1 is one kind of LVQ. When this method is adopted for learning, the discrimination unit 320 considers the feature as a vector and should performs the discrimination from a representative vector (also called as a reference vector) which is a discrimination parameter using the feature of the predetermined number of dimension.

As described above, according to the discrimination system 20 of the present invention, it can be discriminated with the high discrimination precision by the utilization of the parameter learned in the learning systems 10 or 11 even if the visible perturbation is the various object.

The Fourth Exemplary Embodiment

Figure 16:
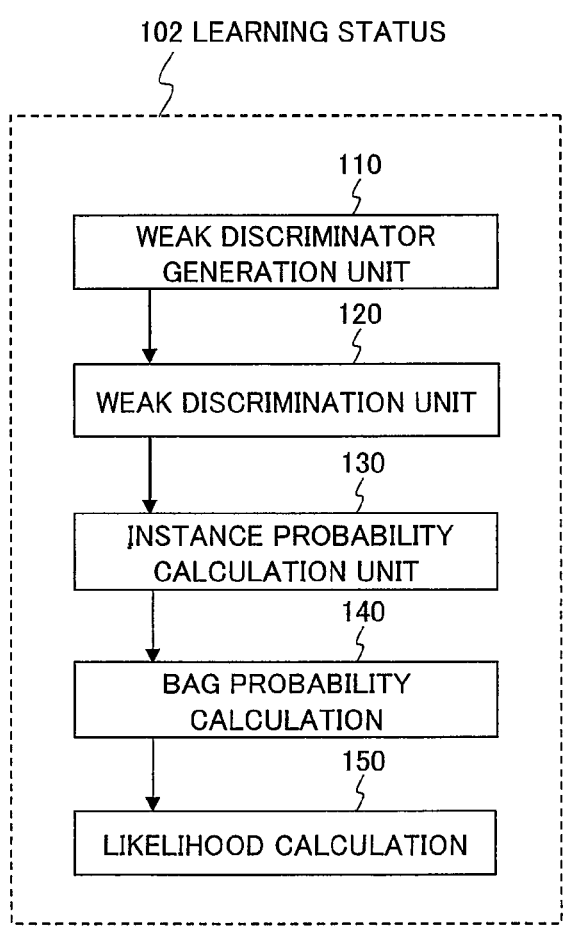
FIG. 16 is a block diagram which shows the functional constitution of a learning apparatus according to the present invention in the fourth exemplary embodiment.

FIG. 16 is a block diagram which shows a functional constitution of a learning apparatus 102 according to the present invention in the fourth exemplary embodiment. As shown in FIG. 16, the learning apparatus 102 includes a weak discriminator generation unit 110, a weak discrimination unit 120, an instance probability calculation unit 130, a bag probability calculation unit 140 and a likelihood calculation unit 150.

The weak discriminator generation unit 110 generates a weak discriminator which calculates the discrimination score that shows whether a target instance is a positive instance based on the feature extracted from a plurality of bags and a bag label which is information whether each bag is a positive bag or a negative bag.

A memory unit which is not illustrated in FIG. 16 may hold the feature and a bag label extracted from a plurality of bags. In the case, the weak discriminator generation unit 110 may read the feature and a bag label appropriately from a memory unit which is not illustrated and generate a weak discriminator.

The weak discrimination unit 120 calculates the discrimination score based on the weak discriminator generated by the weak discriminator generation unit 110.

The instance probability calculation unit 130 calculates the probability (instance probability) that the target instance is an instance (positive instance) of correct target object based on the discrimination score calculated by the weak discrimination unit 120.

The bag probability calculation unit 140 calculates the probability (bag probability) that no smaller than two positive instances are included in the bag based on the instance probability calculated in the instance probability calculation unit 130.

The likelihood calculation unit 150 calculates the likelihood which expresses the plausibility of the calculated bag probability in the bag probability calculation unit 140 based on a bag label. The bag label may be held by a memory unit which is not illustrated in 16. In the case, the likelihood calculation unit 150 may read a bag label from a memory unit which is not illustrated appropriately and calculate the likelihood.

Next, the operation of the learning apparatus 102 will be described with reference to flow charts in FIG. 16 and FIG. 17.

Figure 17:
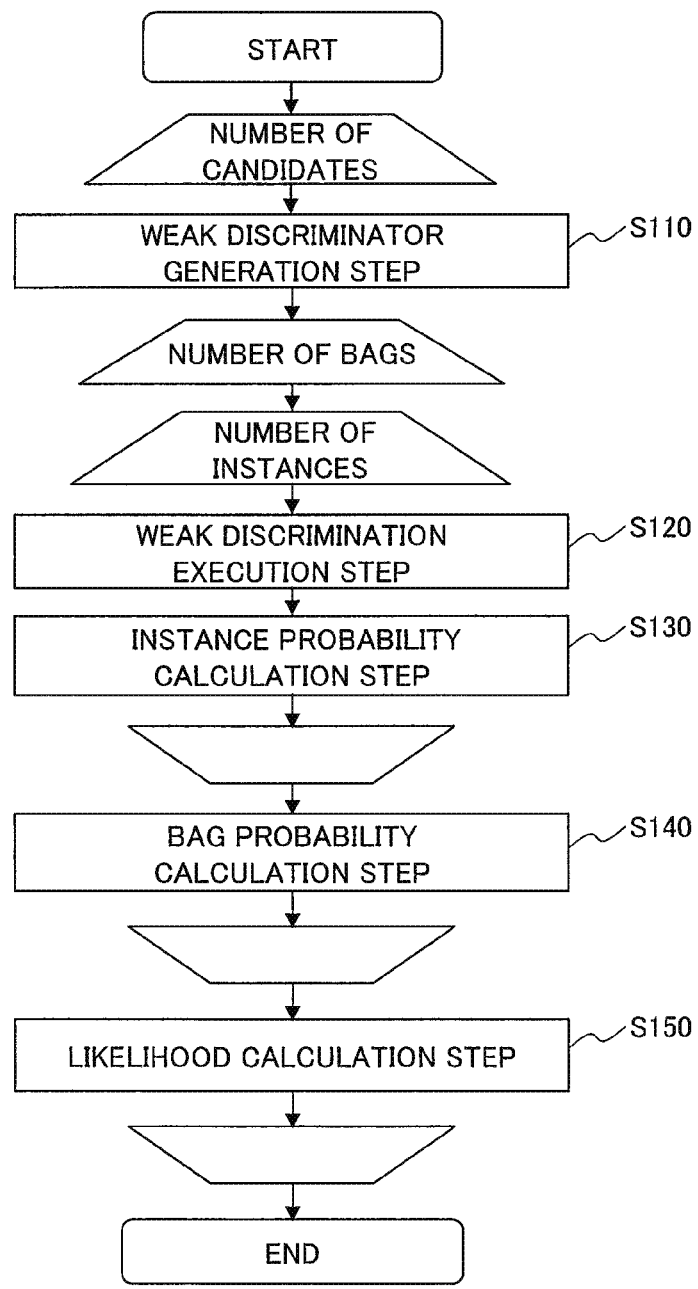
FIG. 17 is a flow chart which shows the operation of a learning apparatus in the fourth exemplary embodiment.

FIG. 17 is a flow chart which shows the operation of the learning apparatus 102 in the fourth exemplary embodiment. As shown in FIG. 17, first, the weak discriminator generation unit 110 generates one weak discriminator based on the feature extracted from a plurality of bags and a bag label which is the information whether each bag is a positive bag or a negative bag [weak discriminator generation step (Step S110)].

Next, the weak discrimination unit 120 performs the weak discrimination concerning to one instance and gets the discrimination score [weak discrimination execution step (Step S120)].

Next, the instance probability calculation unit 130 calculates the probability that the instance is a positive instance in other words the probability that the target object with the correct position, size and rotation angle is an instance (instance probability) [instance probability calculation step (Step S130)].

Further, Step S120 and Step S130 are carried out repeatedly only for all instances in one bag.

Next, for example, the bag probability calculation unit 140 calculates the probability that a bag is positive in other words the probability that no smaller than two among the instances in the bag are positive instances (bag probability) based on the Formula 4 [bag probability calculation step (Step S140)].

Further, the processing to Steps S120 to S140 is carried out repeatedly only for all numbers of bag.

Next, the likelihood calculation unit 150 calculates the probability concerning to all bags used for the learning processing which is calculated by step S140 and the plausibility (likelihood) L of the calculated probability based on the bag label [likelihood calculation step (Step S150)].

Further, the processing to Steps S110 to S150 is carried out repeatedly concerning to all weak discriminator candidates generated in the weak discriminator generation step.

After that, the learning apparatus 102 may select a weak discriminator based on the likelihood calculated in the likelihood calculation step and memory the parameter concerning to the weak discriminator in a memory unit which is not illustrated.

As described above, according to the learning apparatus 102 of the present invention, the leaning is possible which enables to get the high discrimination precision even if the visible perturbation is a various object.

Example

Next, an Example in detail of the first embodiment of the present invention will be described. Hereinafter, an example with the discrimination target of the head of a person will be described.

In this example, as a statistical pattern recognition method, the method disclosed in the patent literature 1 is used. Hereinafter, this method is expressed as "a cascade type GLVQ (the cascade type generalization learning vector quantization)".

First, the cascade type GLVQ will be described concisely before the description of the concrete composition and its operation. In the method with LVQ which is not limited with the cascade type, a representative vector which is called a reference vector for each class to be discriminated is prepared, and the reference vector suitable for the discrimination is searched for by the learning processing.

Here, in particular, the case that the feature pattern has been set as D dimensions vector will be described. In the learning processing of the cascade type GLVQ, first, a certain one dimension is focused and the one-dimensional reference vector is learned only using its dimension value. By carrying out this processing only for all dimensions, D pieces of the one-dimensional reference vector are found. And the vector is selected which directs to the vector which fits to the discrimination at most in the one-dimensional reference vectors. Next, the one dimension with the dimension that has been already selected and the unselected dimension is aimed at, and the two-dimensional reference vector is learned. And by the same procedure as the first dimension, the vector is selected which fits to discrimination at most in the two-dimensional reference vectors. A reference vector of the D dimension is finally found by repeating such processing the after third dimension processing.

Further, in the discrimination processing of the cascade type GLVQ, the distance between the inputted feature pattern and the reference vector is calculated, and the class which the closest reference vector belongs to is discriminated.

Next, the configuration in detail of this example will be described.

In FIG. 5 which is a configuration diagram of the learning system 10, a semiconductor memory is employed as a personal computer and a memory unit 200 as the learning apparatus 100. In this case, a feature memory unit 210, a bag label memory unit 220 and a parameter memory unit 230 can be regarded as a part on the semiconductor memory. On the other hand, the weak discriminator generation unit 110, the weak discrimination unit 120, the instance probability calculation unit 130, the bag probability calculation unit 140, the likelihood calculation unit 150 and the weak discriminator selection unit 160 can be realized on the CPU of a personal computer.

Further, in advance, the feature memory unit 210 holds the data (positive instance) which has extracted the feature concerning to the perturbed head image template and the data (negative instance) which has extracted the feature concerning to the image template which is not an object concerning to the position, scale and rotation angle (refer to FIG. 2 and FIG. 3). The correct information is not necessary to prepare these data concerning to the position, scale and rotation angle.

Beforehand, as the information on a bag including the instance stored in the feature memory unit 210, the bag label memory unit 220 holds the information (bag label) whether each bag is positive or negative.

Next, the operation of this example will be described.

First, the learning system 10 carries out the operation corresponding to Step S110 of FIG. 7. In Step S110, the weak discriminator generation unit 110 generates a weak discriminator which aimed at only a certain one dimension among the D dimensional feature stored in the feature memory unit 210. The operation which generates a weak discriminator corresponds to the operation which learns a discriminator (one-dimensional reference vector group) for one dimension in the cascade type GLVQ.

Next, the learning system 10 carries out the operation corresponding to Step S120. In Step S120, as the weak discrimination by a weak discriminator generated in S110, the weak discrimination unit 120 performs the discrimination processing for one dimension in the cascade type GLVQ and calculates the discrimination score. In the cascade type GLVQ, the real number is outputted as the discrimination score.

Next, the learning system 10 carries out the operation corresponding to Step S130. In Step S130, the instance probability calculation unit 130 calculates the instance probability from the discrimination score by the Formula 3. For example, it may be set to be 1 respectively concerning to the coefficient $\alpha$ and $\beta$ of the Formula 3. Further, the learning system 10 carries out the operations of Step S120 and S130 repeatedly only for all instances in one bag.

Next, the learning system 10 carries out the operation corresponding to Step S140. In Step S140, the bag probability calculation unit 140 calculates the probability that the bag is positive based on the Formula 4. Concretely, the value found by this is the probability that no smaller than two head image templates which has been cut down correctly in the bag are here. Further, the learning system 10 carries out the operation to Steps S120 to S140 repeatedly only for all numbers of bag.

Next, the learning system 10 carries out the operation corresponding to Step S150. In Step S150, a likelihood calculation unit 150 calculates likelihood based on the Formula 5. However, because the case may take place that the value on the away of the calculation becomes a minute value and its numerical calculation becomes unstable as the result, the likelihood calculation unit 150 calculates the logarithm Log (L) of the likelihood L of the Formula 5. Further, the learning system 10 carries out the operation to Steps S110 to S150 with the repetition times whose number is the subtraction of the number of the selected candidates from the number D of the all weak discriminator candidates.

Next, the learning system 10 carries out the operation corresponding to Step S160. In Step S160, a weak discriminator selection unit 160 selects the weak discriminator which becomes the highest likelihood and records the parameter concerning to the selected weak discriminator in a parameter memory unit 230. The recorded parameters are the number of the feature dimension used for the weak discrimination, a reference vector of the cascade type GLVQ and the threshold value of the weak discrimination score. Further, the processing to Steps S110 to S160 carries out the predetermined number of times, for example D times.

By the operation mentioned above, the parameter as a result of the learning processing is held in the parameter memory unit 230.

Other Expressions of the Exemplary Embodiment

In each exemplary embodiment mentioned above, a learning apparatus as shown in below, a learning system, a learning method, a learning program and the characteristic composition of the discriminator are indicated (it is not limited as follows). Further, the learning program of the present invention should be a program which makes a computer execute each step shown in FIG. 7, FIG. 13, FIG. 15 or FIG. 17 and be a program which each step described in each exemplary embodiment makes operate.

[Addition 1]

A learning apparatus includes a weak discriminator generation means for generating a weak discriminator which calculates a discrimination score that shows whether a target instance of is a positive instance based on the feature extracted from a plurality of bags and a bag label which is information whether each bag is a positive bag or a negative bag, a weak discrimination means for calculating the discrimination score based on the weak discriminator generated by the weak discriminator generation means, an instance probability calculation means for calculating a probability (instance probability) that the target instance is an instance (positive instance) of the correct target object based on the discrimination score calculated by the weak discrimination means, a bag probability calculation means for calculating a probability (bag probability) that no smaller than two positive instances are included in the bag based on an instance probability calculated by the instance probability calculation means, and a likelihood calculation means for calculating the likelihood which expresses plausibility of the calculated bag probability in the bag probability calculation means based on the bag label.

[Addition 2]

A learning apparatus according to addition 1, in which the instance of the correct target object is the instance of the target object whose position, size and rotation angle are correct.

[Addition 3]

A learning apparatus according to addition 1 or 2, in which the bag probability calculation means is a conditional bag probability calculation means for calculating a probability (conditional bag probability) that no smaller than two positive instances included in the bag are no smaller than two instances with a close perturbation degree.

[Addition 4]

A learning system is the learning system including a learning apparatus and a memory means according to any one of additions 1-3, the memory means includes a feature memory means for holding the feature that has been extracted from a plurality of bags concerning to the set (positive bag) of a large number of perturbed instances and the set (negative bag) of the instances which is not a positive bag concerning to the target instance which includes no smaller than two instances (positive instance) of the correct target object and a bag label memory means for holding a bag label which is the information whether each bag is a positive bag or a negative bag, in the learning apparatus, the weak discrimination device generation means generates the weak discrimination device based on the feature that the feature memory means holds and a bag label which the bag label memory means holds, the likelihood calculation means calculates the likelihood with targeting for a plurality of bags used for learning based on a bag label which the bag label memory means holds, the learning apparatus includes a weak discrimination device selecting means for selecting a weak discrimination device based on the likelihood calculated by the likelihood calculation means in addition, and the memory means includes a parameter memory means storing a parameter concerning to a weak discrimination device selected by the weak discrimination device selecting means.

[Addition 5]

A learning system according to addition 4, which includes a feature extracting means for extracting the feature from an image of the discrimination target, and a discrimination means for discriminating an object in the image based on the parameter which the parameter memory means stores concerning to the feature that the feature extracting means has extracted.

[Addition 6]

A learning method in which a weak discrimination device which calculates a discrimination score that indicates whether a target instance is a positive instance or not, is generated based on the feature extracted from a plurality of bags and a bag label which is the information whether each bag is a positive bag or negative bag, the discrimination score is calculated based on the generated weak discrimination device, a probability (instance probability) that a target instance is an instance (positive instance) of the correct target object based on the calculated discrimination score is calculated, a probability (bag probability) that no smaller than two positive instances are included in the bag is calculated based on the calculated instance probability, and a likelihood representing plausibility of the calculated bag probability is calculated based on the bag label.

[Addition 7]

A learning method according to addition 6, in which the instance of the correct target object is the instance of the target object whose position, size and rotation angle are correct.

[Addition 8]

A learning method according to addition 6 or 7, in which the bag probability calculation means is a conditional bag probability calculation means for calculating a probability (conditional bag probability) that no smaller than two positive instances included in the bag are no smaller than two instances with the close perturbation degree.

[Addition 9]

A computer-readable storage medium storing a learning program to make a computer executes a processing, includes generating a weak discriminator which calculates a discrimination score that indicates whether a target instance is a positive instance or not, based on a feature extracted from a plurality of bags and a bag label which is information whether each bag is a positive bag or negative bag, calculating the discrimination score based on the generated weak discriminator, calculating a probability (instance probability) that a target instance is an instance (positive instance) of a correct target object based on the calculated discrimination score, calculating a probability (bag probability) that no smaller than two positive instances are included in the bag based on the calculated instance probability, and calculating the likelihood representing plausibility of the calculated bag probability based on the bag label.

[Addition 10]

A computer-readable storage medium storing a learning program according to addition 9, in which the instance of the correct target object is the instance of the target object whose position, size and rotation angle are correct.

[Addition 11]

A computer-readable storage medium storing a learning program according to addition 9 or 10, a learning apparatus according to addition 1 or 2, in which the bag probability calculation means is a conditional bag probability calculation means for calculating a probability (conditional bag probability) that no smaller than two positive instances included in the bag are no smaller than two instances with the close perturbation degree.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-201592, filed on Sep. 9, 2010, the disclosure of which is incorporated herein in its entirety by reference.

INDUSTRIAL APPLICABILITY

A learning apparatus, a learning system, a learning method and a learning program of the present invention can be used for the image arrangement application which classifies the images taken by a camera corresponding to the desired objects such as personality and automobiles and the automatic monitoring application which monitors the object status by detecting the images of the desired objects.

REFERENCE SIGNS LIST

10 Learning system.
11 Learning system.
20 Discrimination system.
30 Learning system.
100 Learning apparatus.
101 Learning apparatus.
102 Learning apparatus.
110 Weak discriminator generation unit.
120 Discrimination unit.
130 Instance probability calculation unit.
140 Bag probability calculation unit.
141 Conditional bag probability calculation unit.
150 Likelihood calculation unit.
160 Weak discriminator selection unit.
200 Memory storage.
210 Feature memory unit.
220 Bag label memory unit.
230 Parameter memory unit.
300 Discrimination apparatus.
310 Feature extracting unit.
320 Discrimination unit.

The invention claimed is:

1. A learning apparatus comprising:
a weak discriminator generation unit which generates a weak discriminator which calculates a discrimination score that shows whether a target instance of is a positive instance based on the feature extracted from a plurality of bags and a bag label which is information whether each bag is a positive bag or a negative bag,
a weak discrimination unit which calculates the discrimination score based on the weak discriminator generated by the weak discriminator generation unit,
an instance probability calculation unit which calculates a probability (instance probability) that the target instance is an instance (positive instance) of the correct target object based on the discrimination score calculated by the weak discrimination unit,
a bag probability calculation unit which calculates a probability (bag probability) that no smaller than two positive instances are included in the bag based on an instance probability calculated by the instance probability calculation unit, and
a likelihood calculation unit which calculates the likelihood which expresses plausibility of the calculated bag probability in the bag probability calculation unit based on the bag label.

2. A learning apparatus according to claim 1, wherein the instance of the correct target object is the instance of the target object whose position, size and rotation angle are correct.

3. A learning apparatus according to claim 1, wherein the bag probability calculation unit is a conditional bag probability calculation unit which calculates a probability (conditional bag probability) that no smaller than two positive instances included in the bag are no smaller than two instances with a close perturbation degree.

4. A learning system comprising a memory unit and the learning apparatus according to claim 1,
wherein the memory unit includes
a feature memory unit which holds the feature that has been extracted from a plurality of bags concerning to the set (positive bag) of a large number of perturbed instances and the set (negative bag) of the instances which is not a positive bag concerning to the target instance which includes no smaller than two instances (positive instance) of the correct target object, and
a bag label memory unit which holds a bag label which is the information whether each bag is a positive bag or a negative bag, and
wherein the learning apparatus includes
the weak discriminator generation unit generates the weak discriminator based on the feature that the feature memory unit holds and a bag label which the bag label memory unit holds,
the likelihood calculation unit calculates the likelihood with targeting for a plurality of bags used for learning based on a bag label which the bag label memory unit holds,
a weak discriminator selecting unit which selects a weak discriminator based on the likelihood calculated by the likelihood calculation unit, and
the memory unit includes a parameter memory unit storing a parameter concerning to a weak discriminator selected by the weak discriminator selecting unit.

5. A learning system according to claim 4, further comprising:
- a feature extracting unit which extracts the feature from an image of the discrimination target, and
- a discrimination unit which discriminates an object in the image based on the parameter which the parameter memory unit stores concerning to the feature that the feature extracting unit has extracted.

6. A learning method comprising:
- generating a weak discriminator which calculates a discrimination score that indicates whether a target instance is a positive instance or not, based on a feature extracted from a plurality of bags and a bag label which is the information whether each bag is a positive bag or negative bag,
- calculating the discrimination score based on the generated weak discriminator,
- calculating a probability (instance probability) that a target instance is an instance (positive instance) of the correct target object based on the calculated discrimination score,
- calculating a probability (bag probability) that no smaller than two positive instances are included in the bag based on the calculated instance probability, and
- calculating the likelihood representing plausibility of the calculated bag probability based on the bag label.

7. A non-transitory computer-readable storage medium storing a learning program to make a computer executes a processing, comprising:
- generating a weak discriminator which calculates a discrimination score that indicates whether a target instance is a positive instance or not, based on a feature extracted from a plurality of bags and a bag label which is information whether each bag is a positive bag or negative bag,
- calculating the discrimination score based on the generated weak discriminator,
- calculating a probability (instance probability) that a target instance is an instance (positive instance) of a correct target object based on the calculated discrimination score,
- calculating a probability (bag probability) that no smaller than two positive instances are included in the bag based on the calculated instance probability, and
- calculating the likelihood representing plausibility of the calculated bag probability based on the bag label.

* * * * *